J. A. HALL.
ANODE.
APPLICATION FILED JUNE 4, 1919. RENEWED JUNE 25, 1920.
1,366,534. Patented Jan. 25, 1921.
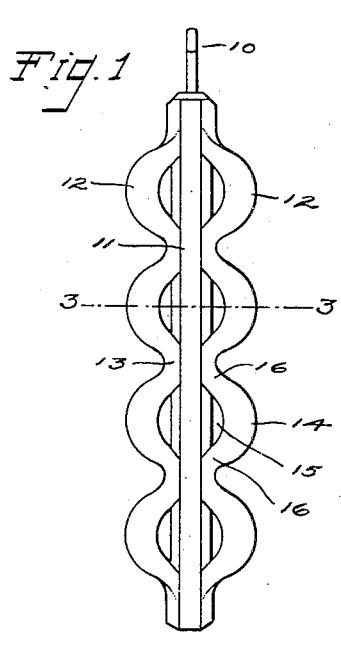
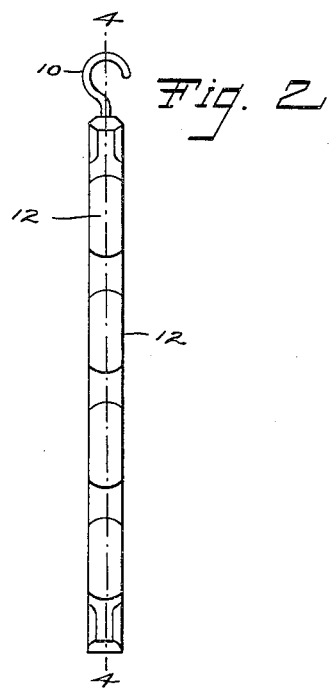
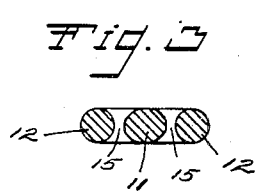
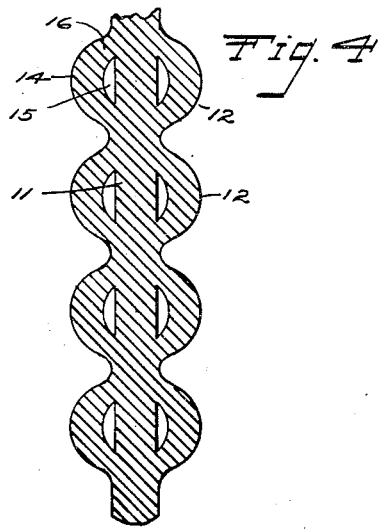
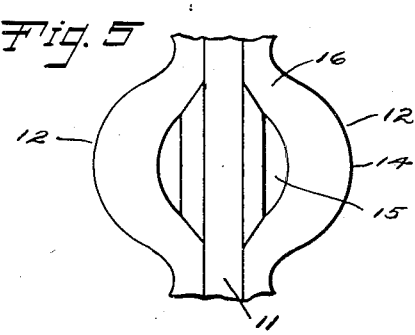
Inventor
Joseph Albert Hall
By Louis M. Schmidt
Atty.

UNITED STATES PATENT OFFICE.

JOSEPH ALBERT HALL, OF NEW BRITAIN, CONNECTICUT, ASSIGNOR OF ONE-HALF TO LEONARD E. HENRY, OF NEW BRITAIN, CONNECTICUT.

ANODE.

1,366,534.  Specification of Letters Patent.  Patented Jan. 25, 1921.

Application filed June 4, 1919, Serial No. 301,830. Renewed June 25, 1920. Serial No. 391,833.

*To all whom it may concern:*

Be it known that I, JOSEPH ALBERT HALL, a citizen of the United States, residing at New Britain, in the county of Hartford and State of Connecticut, have invented certain new and useful Improvements in Anodes, of which the following is a specification.

My invention relates to improvements in anodes, of the form used for electro-plating with nickel, copper, and other metals, and the object of my improvement is to produce an anode having a form of construction that is substantially without sharp points or edges, that presents a relatively large surface that is exposed in the bath as a working or active surface, and that will be reduced or eaten away by the corrosive effect when in use substantially uniformly for different parts of the length and thereby avoid waste.

In the accompanying drawing:—

Figure 1 is a side elevation of my improved anode.

Fig. 2 is an edge view of the same.

Fig. 3 is a sectional view on the line 3—3 of Fig. 1.

Fig. 4 is a sectional view on the line 4—4 of Fig. 2.

Fig. 5 is a fragmentary side elevation, on an enlarged scale.

My improved anode is provided with a hook 10 at the upper end that is of convenient form for use as a hanger for connection with the rod or bar that is provided on the box or container that contains the electrolyte and the anode proper extends downwardly from the said hook 10.

The said anode proper or body portion of the anode structure comprises a main portion 11 that serves as a trunk or backbone, that is of appreciable length, is straight, and is of substantially uniform cross-section throughout the length. In detail, the said cross-section may be round or, as shown, octagonal, with the corners rounded.

Attached to the trunk 11 are a plurality of branches 12 of peculiar form and that are connected to the said trunk by both ends, so as to provide a loop form for each branch 12.

The branches 12, as shown, are attached to the side of the trunk 11 in each case and are arranged in pairs, the two members of each pair being attached to the opposite sides of the said trunk 11, so that the structure as a whole is in the form of a plane of skeleton form.

The branches 12 are all similar and the form of the junction 13 of the branches 12 and the trunk 11 is such as to avoid the formation of sharp outwardly directed edges or corners.

As shown, there are four pairs of the branches 12 extended along the length of the trunk 11.

Each branch 12 is of appreciable size and is generally of arc form of appreciable angular extent, the middle portion 14 being separated from the trunk 11 by an open space 15.

As a detail, the said middle portion 14 of the branch 12 in each case is of appreciably greater cross-section or fatter than the end portions 16 that merge into the junction 13.

The branches 12 are, as described, electrically connected by both ends with the trunk 11, which latter serves both as the mechanical support and the main conductor for the plating current.

In use, my improved anode, as described, is corroded substantially uniformly, so that there is relatively small waste or scrap.

I claim as my invention:—

1. An anode for plating comprising a trunk of straight form and appreciable length and branches connected to the said trunk, and the said branches being connected by two ends with the said trunk and having the middle portion separated from the said trunk by an open space.

2. An anode as described in claim 1, and the said branches being arranged in pairs, connected symmetrically to opposite sides of the said trunk.

3. An anode as described in claim 2, and each of the said branches having a tapered form from the ends that are connected to the said trunk outwardly with a maximum at the middle portion of the said branch.

4. An anode in the form of a rod-like structure provided with means for being supported by the upper end and comprising an active portion that is composed of a backbone portion of elongated form and a plurality of side branches that are supported by the said backbone portion, the said branches being each of loop form and having their ends merged into the structure of the said backbone.

JOSEPH ALBERT HALL.